(12) United States Patent
Wang et al.

(10) Patent No.: US 6,920,446 B1
(45) Date of Patent: Jul. 19, 2005

(54) REPRESENTING SPATIAL OBJECTS IN A DEFINED SPACE

(75) Inventors: Xidong Wang, Madison, WI (US); Michael W. Watzke, Madison, WI (US); Curt L. Ellmann, Madison, WI (US)

(73) Assignee: NCR Corporation, Dayton, OH (US)

( * ) Notice: Subject to any disclaimer, the term of this patent is extended or adjusted under 35 U.S.C. 154(b) by 436 days.

(21) Appl. No.: 10/103,074

(22) Filed: Mar. 21, 2002

(51) Int. Cl.$^7$ .............................................. G06F 17/30
(52) U.S. Cl. ...................................... 707/2; 707/103 R
(58) Field of Search ....................... 707/1–10, 100–102, 707/103 R, 103 Y, 103 Z, 104.1, 203, 205

(56) References Cited

U.S. PATENT DOCUMENTS

| | | | |
|---|---|---|---|
| 5,303,383 A | 4/1994 | Neches et al. .............. 220/270 |
| 5,640,584 A | 6/1997 | Kandasamy et al. .......... 712/30 |
| 5,864,842 A | 1/1999 | Pederson et al. .............. 707/3 |
| 5,884,299 A | 3/1999 | Ramesh et al. ................ 707/2 |
| 6,678,686 B1 * | 1/2004 | Patel et al. ................. 707/100 |
| 6,684,219 B1 * | 1/2004 | Shaw et al. ............. 707/103 R |
| 6,732,084 B1 * | 5/2004 | Kabra et al. .................... 707/2 |

OTHER PUBLICATIONS

Volker Gaede, "Geometric Information Makes Spatial Query Processing More Efficient", 1995 pp. 1–8 ACM GIS.*

Volker Gaede, "Geometric Information Makes Spatial Query Processing More Efficient," pp. 1–8, ACM GIS (1995).

Jack Orenstein et al., IEEE Transactions on Software Engineering, vol. 14, No. 5 "Probe Spatial Data Modeling and Query Processing in an Image Database Application," pp. 611–629 (May 1988).

Volker Gaede, "Optimal Redundancy in Spatial Database Systems," pp. 96–116, Proc. 4$^{th}$ Int. Symposium on Advances in Spatial Databases (1995).

Jack A. Orenstein et al., "Redundancy in Spatial Databases," pp. 294–305, Proc. ACM SIGMOD Int. Conf. On Management of Data (1989).

Volker Gaede et al., ACM Computing Surveys, vol. 30, No. 2, "Multidimensional Access Methods," pp. 171–231 (Jun. 1998).

Jens–Peter Dittrich et al., "Data Redundancy and Duplicate Detection in Spatial Join Processing," pp. 535–546, ICDE (2000).

Jack A. Orenstein et al., "A Class of Data Structures for Associative Searching," pp. 181–190, Proc. of the Third ACM SIGACT–SIGMOD Symposium on Principles of Data–base Systems (1984).

* cited by examiner

Primary Examiner—Diane D. Mizrahi
(74) Attorney, Agent, or Firm—Trop, Pruner & Hu, P.C.; Harden E. Stevens, III (57) ABSTRACT

A database system is able to represent spatial data with regions in a defined space, such as a z-ordered space. Instead of, or in addition to, a descending decomposition technique (e.g., a top-down decomposition technique) to represent the spatial data with the z-ordered space, the database system is able to use an ascending decomposition technique (e.g., a bottom-up decomposition technique).

28 Claims, 6 Drawing Sheets

REPRESENTING SPATIAL OBJECTS IN A DEFINED SPACE

BACKGROUND

A database is a collection of stored data that is logically related and that is accessible by one or more users. A popular type of database is the relational database management system (RDBMS), which includes relational tables made up of rows (or tuples) and columns (or attributes). Each row represents an occurrence of an entity defined by a table, with an entity being a person, place, or thing about which the table contains information.

With advances in database technology, increasingly complex types of data can be efficiently stored in database systems. Examples of complex types of data include spatial data, image data, audio data, video data, and so forth. There are several different types of spatial data. As examples, geographic applications and graphics design involve two-dimensional data. Geological applications and imaging applications involve three-dimensional data. In certain other applications, representation in four dimensions is needed, such as the representation of moving three-dimensional objects.

A challenge that has faced developers of database systems is providing a representation of spatial data that enables efficient database operations, such as joins. Various techniques have been developed, with one example technique based on z-ordering. Z-ordering approximates a given object geometry by recursively decomposing a data space into smaller subspaces, referred to as z-regions or z-cells. Z-ordering allows multiple resolution levels where a single spatial object can be composed of z-regions of varying resolution. Also, sets of spatial objects can be composed of regions of varying resolution. This enables the ability to efficiently manage sets of spatial objects of varying size.

Conventional z-ordering techniques decompose spatial objects into z-ordered regions using a top-own approach in which each spatial object is recursively decomposed from larger regions to smaller regions until some decomposition goal is achieved. Examples of such decomposition goals include error-based, size-bound, and granularity-bound goals. The error-bound goal defines a certain fixed accuracy (e.g., distance between object boundary and approximating geometry) that when reached causes decomposition to stop. The size-bound goal defines a maximum number of z-regions with which to approximate a spatial object. The granularity-bound goal causes decomposition to occur until a certain finest granularity (maximum number of decompositions or maximal resolution) is achieved.

The top-down approach has several drawbacks. Decomposing small spatial objects using the top-down technique can be costly in terms of computing resources since the top-down decomposition approach requires "contains" and "overlaps" comparisons for each element in the recursive descent. Contains and overlaps refer to the geometric relationship between z-ordered regions and portions of the spatial object. Also, because of the random nature in which z-ordered regions are chosen to represent a spatial object, optimal assignment of the spatial object to the z-ordered regions may not be accomplished.

SUMMARY

In general, an improved method and apparatus is provided for representing a spatial object in a defined space, such as z-ordered space. For example, a database system includes a storage to store spatial data and a controller to represent the spatial data in a defined space (e.g., z-ordered space) having plural levels (e.g., z-levels). Each level of the defined space has one region or a plurality of regions. The controller is adapted to initially represent the spatial data with regions at a first level lower than a top level in the defined space, and subsequently to merge at least some of the regions at the first level into regions at a higher level in the defined space to represent the spatial data Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
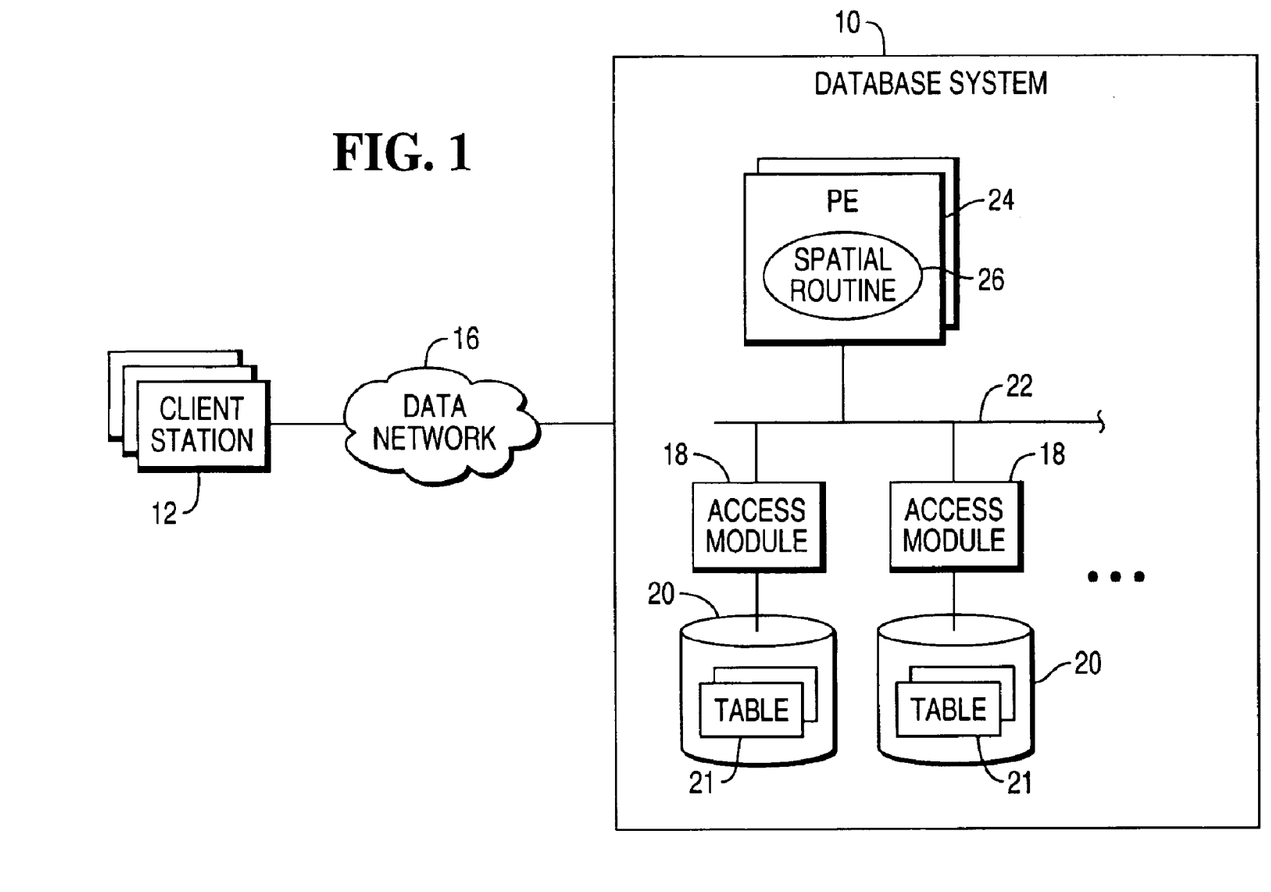
FIG. 1 is a block diagram of an example arrangement of a database system and one or more client stations coupled to the database system.

FIG. 1 shows a database system 10 that is coupled to one or more client stations 12 over a data network 16. Examples of the data network 16 include a private network, such as a local area network (LAN) or a wide area network (WAN), or a public network such as the Internet. The one or more client stations 12 are able to issue queries (according to a standard database query language) to the database system 10 over the data network 16. One example standard database query language is the Structured Query Language (SQL), which is provided by the American National Standards Institute (ANSI), with one version being the SQL-99 Standard (also referred to as the SQL-3 Standard).

Although reference is made to SQL-99 in this description, other embodiments can employ other types of standard database query languages that provide for the ability to store spatial objects. For example, SQL-99 provides for user-defined data types (UDTs) that can be created by a user, an application, a database management system, or another standard (other than the database query language standard) to store spatial objects. Note that a data type for storing spatial objects does not need to be a UDT, as certain database systems may have predefined or built-in data types for storing spatial data.

The database system 10 includes a plurality of access modules or data server nodes 18. Each access module 18 manages access of data stored in a respective storage module 20. In one embodiment, the access modules 18 include access module processors (AMPs) that are based on AMPs used in TERADATA® database systems from NCR Corporation. Although shown as discrete components, the storage modules 20 can be part of the same storage subsystem, with the storage modules 20 representing different portions of the storage subsystem. In another embodiment, each storage module 20 can represent a different physical storage device or group of devices.

As shown, relational tables 21 are stored in the storage modules 20, with each table distributed or partitioned across the multiple storage modules 20 and respective access modules 18. The access modules 18 are coupled together by an interconnect layer 22, which is also coupled to a parsing engine 24 (or plural parsing engines). The parsing engine 24 interprets a query, such as one received from a client station 12, checks the query for proper SQL syntax, and sends out executable actions to be performed by one or plural access modules 18.

The access modules 18 are capable of concurrently accessing data stored in respective portions of each table 21. Concurrency is important for efficient data management in a database system storing relatively large amounts of data (e.g., hundreds of gigabytes or multiples of terabytes of data). The database system 10 shown in FIG. 1 is an example of a parallel database system.

In one embodiment, the access modules 18 and parsing engine 24 are software modules that are executable in the database system 10. Such software modules are executable in one or more physical nodes in the database system 10. One node can include a single access module 18, or alternatively, multiple access modules 18. Although reference is made to a parallel database system, other embodiments of the invention can be implemented in a single-node or uni-processor database system.

As further shown in FIG. 1, a spatial routine 26 is part of the parsing engine 24. Although not shown, a part of the spatial routine 26 is also in the access modules 18. Thus, although referred to in the singular sense, the spatial routine 26 can actually be implemented as plural routines or modules. Alternatively, the spatial routine 26 is separate from, but accessible by, the parsing engine 24.

The spatial routine 26 is able to decomposes spatial objects according to a z-ordering algorithm for storage in the tables 21 in the database system 10. However, unlike conventional z-ordering algorithms that decompose a spatial object with a top-down technique to identify regions in the z-ordered space to represent the spatial object, some embodiments of the invention are able to use a bottom-up technique to identify regions in the z-ordered space to represent the spatial object. The bottom-up decomposition technique is implemented in place of, or in addition to, the top-down decomposition technique.

For many spatial objects, the bottom-up z-ordered decomposition technique requires less processing by the database system than with a top-down z-ordered decomposition technique. However, as an optimization, the database system can be configured to selectively use one of the top-down and bottom-up decomposition techniques based on a characteristic of the spatial object, such as its size. If the spatial object is relatively large, the top-down decomposition technique is used; if the spatial object is relatively small, then the bottom-up decomposition technique is used.

Generally, the top-down decomposition technique starts the decomposition at an initial high level (such as the top level) in z-ordered space and iteratively decomposes or subdivides the space at the initial high level into increasingly smaller regions in z-ordered space. More generally, this decomposition technique is referred to as a "descending" decomposition technique.

On the other hand, the bottom-up decomposition technique starts at an initial low level (such as the level of lowest granularity) in z-ordered space and iteratively merges regions of the initial low level into increasingly larger regions at higher levels in z-ordered space. More generally, this latter technique is referred to as an "ascending" decomposition technique.

Figure 2:
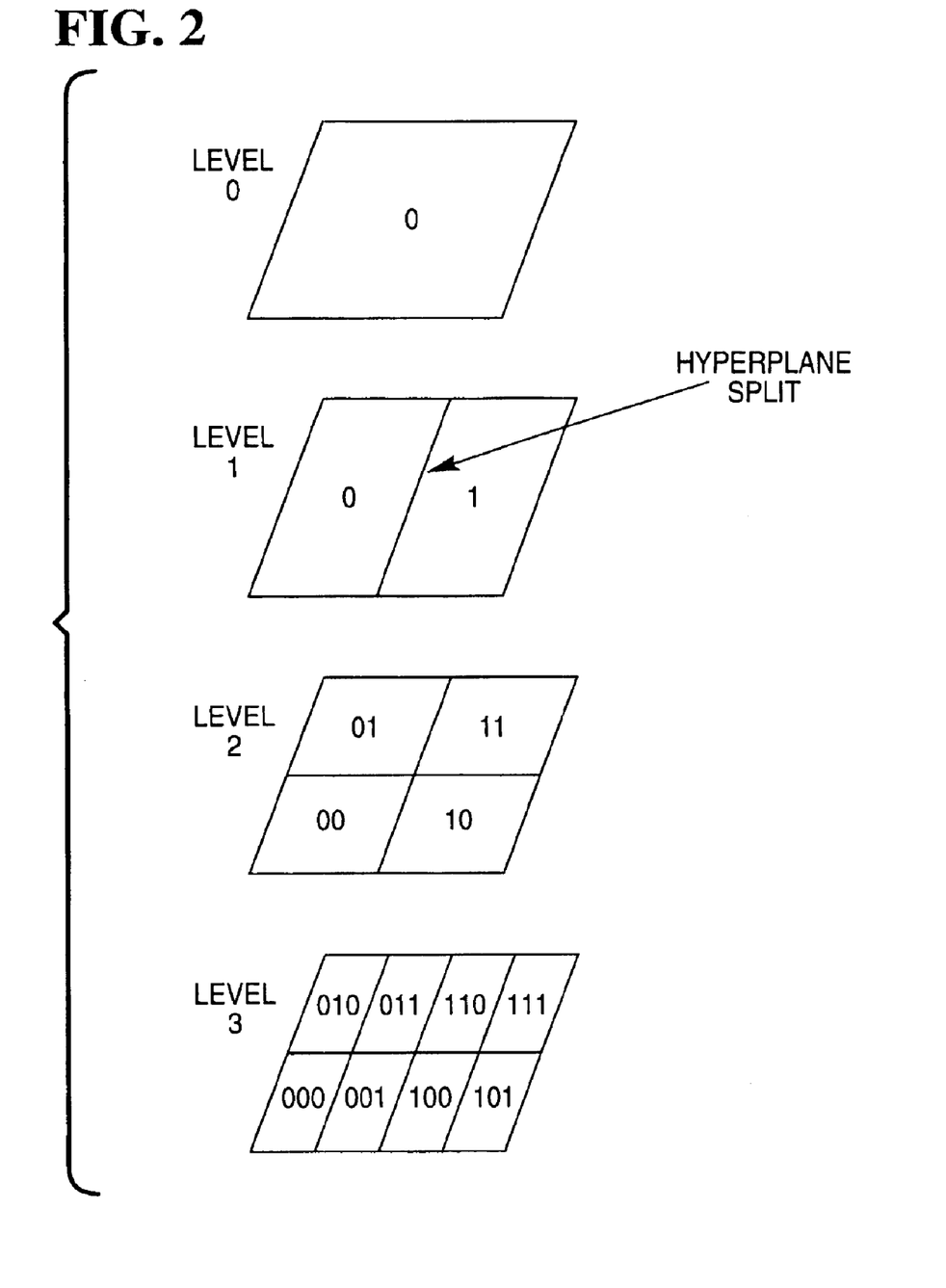
FIG. 2 illustrates the multiple z-levels of z-ordered space.

The concept of z-ordering is explained in conjunction with FIG. 2, which shows multiple z-levels of z-regions or z-cells. Z-level 0 is the uppermost z-level. The space at z-level 0 is divided into an arbitrary granularity using a recursive decomposition process. The subdivisions of space are referred to as z-regions. Each z-region in space is assigned a z-value. FIG. 2 shows z-ordering applied to two-dimensional objects. Other embodiments of the invention can be applied to three- or four-dimensional objects.

Starting with a given spatial object (e.g., a map representing a region of the world), the spatial object is decomposed into z-regions. Thus, as shown in FIG. 2, the space at z-level 0 is divided into two halves along an axis (referred to as a hyperplane). Top-down z-ordering decomposition works as follows: Starting with the complete data space, z-regions are computed by splitting the respective data space along hyperplanes (e.g., one of a vertical axis and horizontal axis). The z-regions are iteratively split until a termination criterion is met. After every split, a z-region in which a spatial object is found is further analyzed. In case a hyperplane intersects a geometry, the geometry is split along the hyperplane and the z-ordering decomposition proceeds recursively with the two resulting sub-geometries and their corresponding subspaces until completion. As a net result of the decomposition, the extended object geometry is approximated with many z-regions possibly of different sizes.

A relational table has multiple rows, each capable of storing a spatial object. The number of z-regions and the corresponding z-levels(s) used to represent each spatial object depends on the specific characteristic of the spatial object. As a result, it is possible for plural spatial objects stored in a relational table to be represented by z-regions at different z-levels. For example, a first spatial object (in a first row) of table A can be represented by z-regions at z-level 1, a second spatial object (in a second row) of table A can be represented by z-regions at z-level 2, and so forth. Thus, for a spatial object in a given row, multiple z-regions or z-cells can be assigned to represent the spatial object (referred to as "multiple assignment"). In fact, a spatial object can be represented by multiple z-regions at more than one z-level.

Depending on the location of a subspace relative to a splitting hyperplane, a "0" or a "1" is appended to the splitting sequence referred to as the z-value or z-code. Thus, as shown in FIG. 2, the z-region at z-level 0 has a z-code of "0". At z-level 1, after the split into two z-regions, the z-region on the left side of the splitting hyperplane is assigned a z-code "0", while the z-region on the right of the splitting hyperplane is assigned a z-code "1". Next, z-regions at z-level 1 are split by a hyperplane that is parallel to a horizontal axis. Again a "0" or "1" value is appended to the z-code. In this example, a "0" is appended to the z-code for the two lower z-regions, while a "1" is appended to the z-codes for the upper z-regions at z-level 2. The left-lower z-region is assigned z-code "00" (as a result of appending a "0" to the base z-code "0"), and the right lower z-region is assigned z-code "10" (as a result of appending a "0" to the base z-code "1"). The left upper z-region is assigned z-code "01", and the right upper z-region is assigned z-code "11". Another vertical split is performed to subdivide the z-regions at z-level 2 into respective two halves to provide 8 z-regions at z-level 3. Again, a "0" or "1" value is appended to the z-code of each of the split z-regions.

Figure 3:
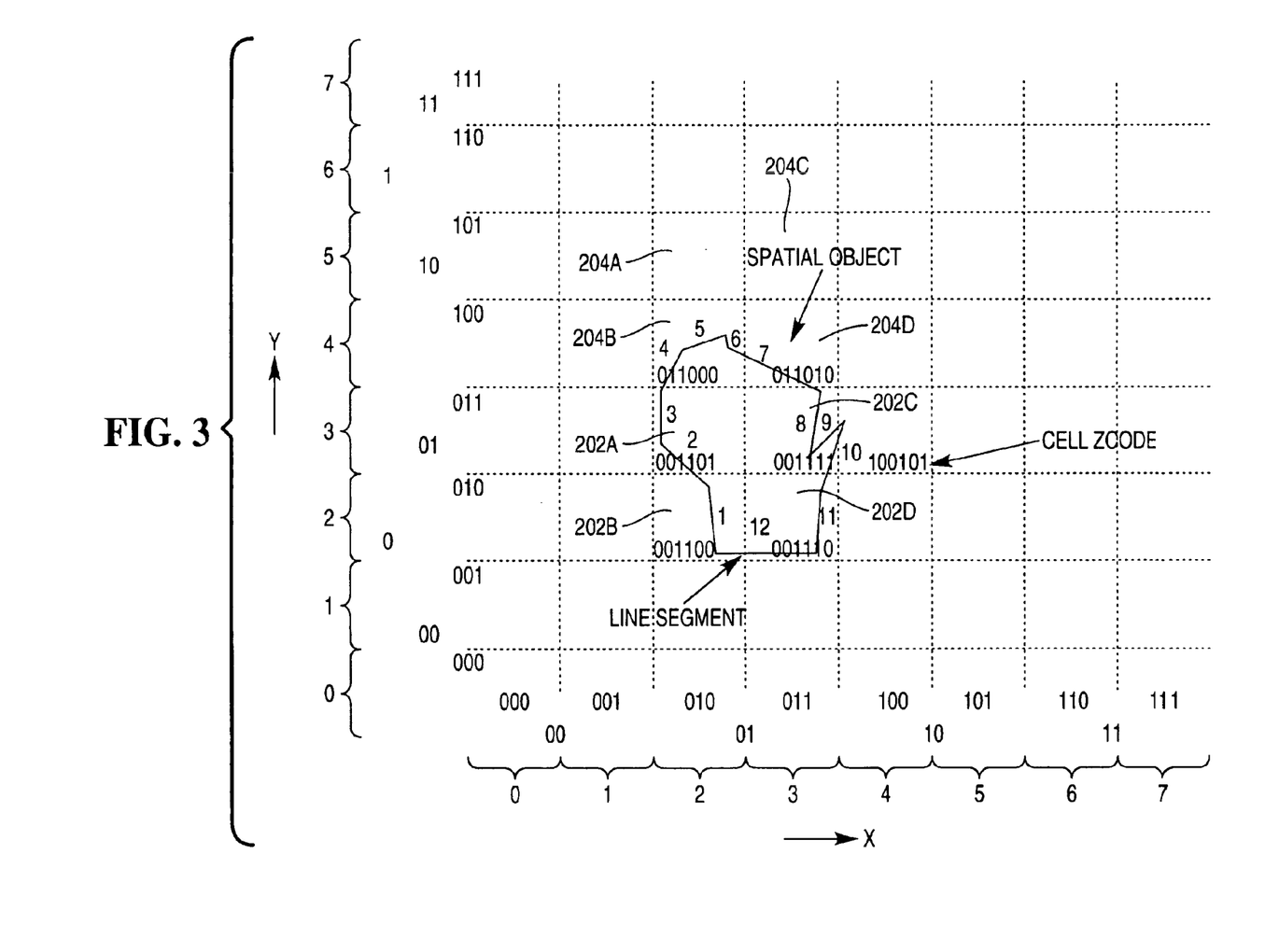
FIG. 3 illustrates the representation of a spatial object at a level in z-ordered space.

The bottom-up z-ordered decomposition technique (or more generally, the ascending z-ordered decomposition technique) is discussed in connection with the example spatial object of FIG. 3. The example spatial object shown in FIG. 3 has a boundary with 12 line segments, including line segments 1, 2, . . . , 12. In the example of FIG. 3, the lowermost z-level is level 6. The z-ordered space at each level is made up of an array of z-regions. Each z-region is associated with a z-code, which has a value that depends on the level that the z-region is at and the location of the z-region within the z-ordered space.

For purposes of this discussion, the grid of z-regions shown in FIG. 3 is divided according to intervals along a first axis (X axis) and intervals along a second axis that is perpendicular to the first axis (Y axis). The intervals along the X axis are referred to as X intervals, and the intervals along the Y axis are referred to as Y intervals. For example, line segment 1 of the spatial object lies in a z-region that is at the intersection of X interval 2 and Y interval 2, as shown in FIG. 3.

FIG. 3, at z-level 6, X intervals 0–7 are shown along the X axis and Y intervals 0–7 are shown along the Y axis. X interval 0 is associated with the binary value 000, X interval 1 is associated with the binary value 001, and so forth. Similarly, at z-level 6, Y interval 0 is associated with the binary value 000, Y interval 1 is associated with the binary value 001, and so forth The z-code assigned to a given z-region at z-level 6 is a bit interleave of the X and Y interval values. Given an X interval xxx (binary value) and Y interval yyy (binary value), the z-code of the z-region at the intersection of the X interval and Y interval is the bit interleave value xyxyxy. Thus, the z-region containing line segment 2 of the spatial object at the intersection of X interval 2 (binary value 010) and Y interval 3 (binary value 011) has the following z-code: 001101.

Figure 4:
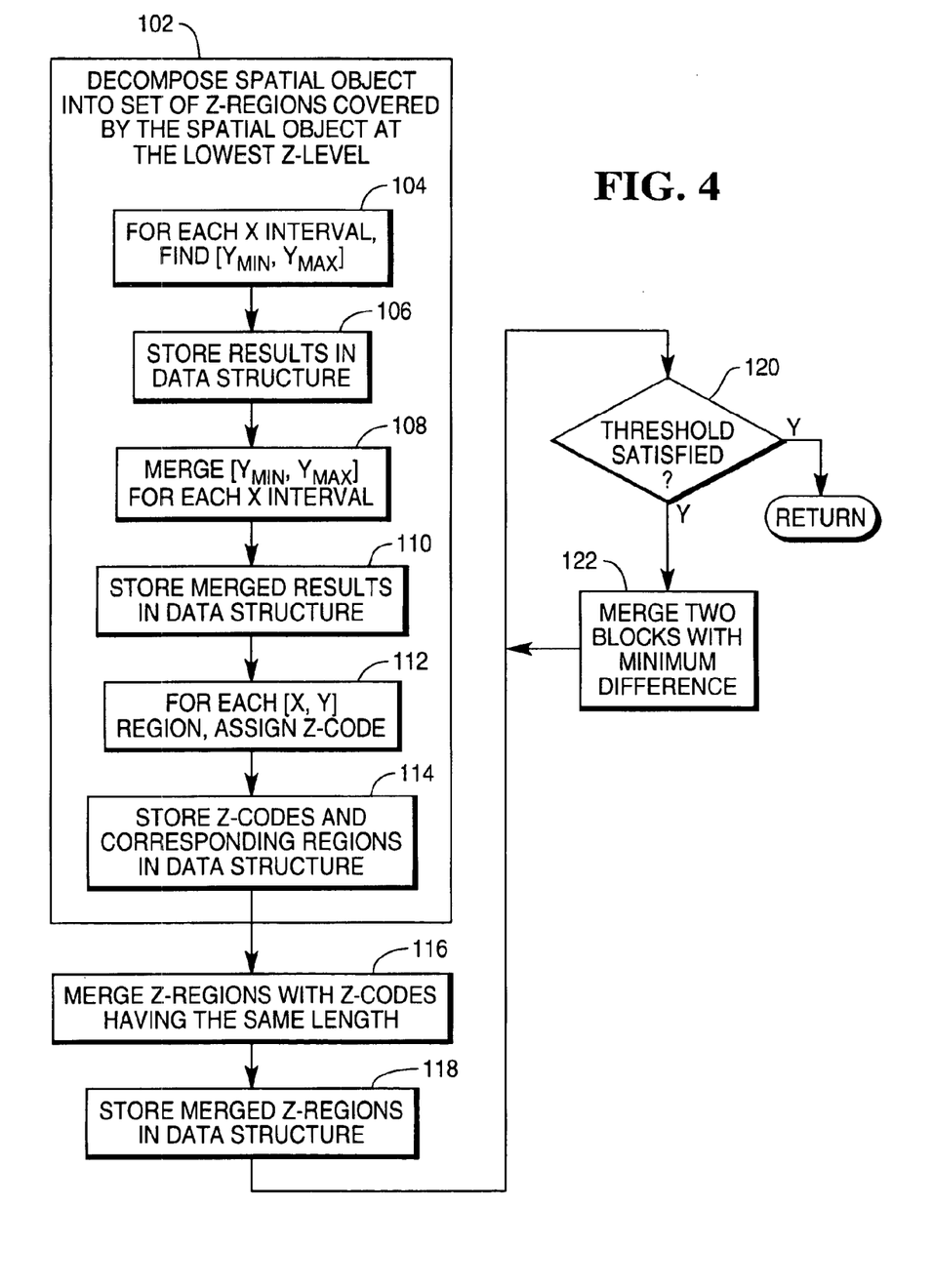
FIG. 4. is a flow diagram of a process performed by a spatial routine in the database system of FIG. 1 to represent a spatial object, in accordance with an embodiment.

FIG. 4 shows a flow diagram of a bottom-up decomposition algorithm according to one embodiment of the invention. The spatial routine 26 first decomposes (at 102) the spatial object into a set of z-regions covered by the spatial object at the lowest z-level. In decomposing (at 102) the spatial object into the set of z-regions at the lowest z-level, the spatial routine 26 computes (at 104) the $Y_{min}$ and $Y_{max}$ intervals for each X interval covered by each line segment of the spatial object. Thus, in the example of FIG. 3, line segment 2 of the spatial object covers X interval 2. The $Y_{min}$ interval covered by line segment 2 along X interval 2 is Y interval 2, and the $Y_{max}$ interval covered by line segment 2 of the spatial object along X interval 2 is Y interval 3. The result of the computation at 104 is stored (at 106) in a data structure, such as a hash table. For the example of FIG. 3, the table is as follows (Table 1):

TABLE 1

| Line Segment | X Interval | Y min | Y max |
|---|---|---|---|
| 1 | 2 | 2 | 2 |
| 2 | 2 | 2 | 3 |
| 3 | 2 | 3 | 3 |
| 4 | 2 | 4 | 4 |
| 5 | 2 | 4 | 4 |
| 6 | 2 | 4 | 4 |

TABLE 1-continued

| Line Segment | X Interval | Y min | Y max |
|---|---|---|---|
| 7 | 2 | 4 | 4 |
|   | 3 | 4 | 4 |
| 8 | 3 | 3 | 3 |
| 9 | 3 | 3 | 3 |
|   | 4 | 3 | 3 |
| 10 | 3 | 2 | 3 |
|    | 4 | 3 | 3 |
| 11 | 3 | 2 | 2 |
| 12 | 2 | 2 | 2 |
|    | 3 | 2 | 2 |

The table indicates that line segment 1 of the spatial object is found in X interval 2. Along the Y axis, line segment 1 covers Y interval 2. As a result, $Y_{min}$ and $Y_{max}$ are both set to the value 2. Line segment 10 is an example of a segment of the spatial object that covers two X intervals and two Y intervals. Line segment 10 covers X intervals 3 and 4. In X interval 3, line segment 10 covers Y intervals 2 and 3 ($Y_{min}$ is set to 2 and $Y_{max}$ is set to 3). In X interval 4, line segment 10 covers only Y interval 3 ($Y_{min}$ is set to 3 and $Y_{max}$ is set to 3).

Note that instead of finding $Y_{min}$ and $Y_{max}$ for each X interval, the reverse can be performed—finding $X_{min}$ and $X_{max}$ intervals for each Y interval covered by a line segment of a spatial object.

After all line segments in the boundary of the spatial object have been computed and X and Y intervals identified and stored in Table 1, the Y interval values [$Y_{min}$, $Y_{max}$] for each X interval are merged (at 108) to get the overall [$Y_{min}$, $Y_{max}$]. The result is then stored (at 110) in a data structure, such as Table 2, in which $Y_{min}$ and $Y_{max}$ values have been merged.

TABLE 2

| X Interval | Y min | Y max |
|---|---|---|
| 2 | 2 | 4 |
| 3 | 2 | 4 |
| 4 | 3 | 3 |

Thus, as shown in Table 2 above, for X interval 2, $Y_{min}$ is set 2 (which is the minimum Y interval covered by any line segment of the spatial object along X interval 2) and $Y_{max}$ is set equal to 4 (which is the maximum Y interval covered by any line segment of the spatial object along X interval 2). Note that line segments 1–7 cover X interval 2. These line segments cover Y intervals 2, 3, and 4—hence $Y_{min}$=2 and $Y_{max}$=4. Similarly, for X interval 3, $Y_{min}$ is set to 2 and $Y_{max}$ is set to 4. In X interval 4, $Y_{min}$ is set to 3 and $Y_{max}$ is set to 3.

For each [X interval, Y interval] pair, a z-code is assigned (at 112). The assigned z-codes along with corresponding X, Y interval pairs are stored (at 114) in a data structure such as a table (Table 3 below) along with the level at which the corresponding z-region is located (in this example level 6).

TABLE 3

| Cell | ZCode | Level |
|---|---|---|
| 2,2 | 001100 | 6 |
| 2,3 | 001101 | 6 |
| 2,4 | 011000 | 6 |

TABLE 3-continued

| Cell | ZCode  | Level |
|------|--------|-------|
| 3,2  | 001110 | 6     |
| 3,3  | 001111 | 6     |
| 3,4  | 011010 | 6     |
| 4,3  | 100101 | 6     |

Next, the z-regions at level 6 (the lowest z-level of the z-ordered space in the example of FIG. 3) are merged (at 116) based on a predetermined criterion. For those z-regions having z-codes with the same length, the z-regions are sorted by their z-code values. Next, the z-code of a z-region is compared with its neighbor. If only the last bit of the z-codes of the neighboring z-regions are different, then the z-regions are merged and the z-code is replaced with a new z-code. The z-regions at a lower level are merged into a "block" at a higher level in z-ordered space. Note that the term "block" refers to a z-region at the higher z-level. As used here, "block" is used interchangeably with "region" in a defined space (such as z-ordered space).

In the example of FIG. 3, the merge performed at 116 causes z-regions at [2,2], [2,3], [3,2], and [3,3] to be merged. Note that the z-region at [2,2] and the z-region at [2,3] differ by their last z-code bit, and thus can be merged to form a z-region (or block) at z-level 5 with the following z-code: 00110. Similarly, the z-region [3,2] and z-region [3,3] at level 6 can be combined into a single z-region (or block) at level 5 with the following z-code: 00111. Note that the two z-regions at level 5 can further be combined since their z-codes differ only be their last bit; therefore, the two z-regions at level 5 are combined into a z-region (or block) at level 4 with the following z-code: 0011.

In FIG. 3, the four z-regions merged at 116 are the four neighboring z-regions 202A, 202B, 202C, and 202D. Note that the merging of these z-regions does not increase the area covered by the resultant block containing the merged z-regions. In other words, the area of the resultant block is the same as the combined area of the merged z-regions. Generally, this is true of all merges performed at 116. The merger performed at 116 reduces the number of z-regions in the spatial object's representation without increasing the approximation error, since the area of coverage of z-ordered elements remains the same.

The results are stored (at 118) in a data structure, such as Table 4:

TABLE 4

| Block Start | Block End | ZCode  | Level |
|-------------|-----------|--------|-------|
| 2,2         | 3,3       | 0011   | 4     |
| 2,4         | 2,4       | 011000 | 6     |
| 3,4         | 3,4       | 011010 | 6     |
| 4,3         | 4,3       | 100101 | 6     |

In Table 4, the merged level-6 z-regions are in a block at z-level 4 that starts at [2,2] and ends at [3,3]. The z-code associated with this block is 0011. The remaining z-regions are still at level 6 since they have not been merged at 116. The merge at 116 is repeated until there are no further neighboring z-regions (at any z-level) with z codes that differ only by the least significant bit.

Next, after merging of the z-regions at 116, the spatial routine 26 checks (at 120) if a predefined threshold has been met. In one example, the threshold is a maximum number of blocks (or z-regions) that can be used to represent a given spatial object. Assume, for example, the threshold is 3. Note that in Table 4, there are four blocks representing the spatial object, which exceeds the threshold.

If the threshold has not been met, as determined at 120, the spatial routine 26 performs a further merge (at 122). Although the merge performed at 116 does not increase the area of coverage by z-ordered elements, the further merge performed at 120 may cause an increase in the area of coverage and thus the approximation error. To minimize the increase in the area resulting from the further merge, comparisons are made of the z-codes for each pair of blocks, with the two blocks having the minimum difference (in z-code value) selected for merging.

Table 4, above, identifies four blocks (referred to as blocks 1, 2, 3, and 4) with the following z-codes: 0011, 011000, 011010, and 100101. The latter three blocks have z-codes of the same length, which differs from the length of the z-code associated with the first block. The z-code of block 1 is compared with the z-code of each of blocks 2, 3, and 4. The z-code of block 2 is compared with the z-code of each of blocks 3 and 4. The z-code of block 3 is compared with the z-code of block 4. Thus, in one embodiment, the z-codes of every combination of two blocks are compared.

However, to reduce the amount of work, the blocks in Table 4 can first be re-sorted based on their z-code values. Then, only z-codes of blocks that are in close proximity to each other need to be compared, reducing the number of comparisons needed.

The difference is found by performing an exclusive-or operation of the z-codes of the two blocks. If the two z-codes are of different length, then the lowest two bits are deemed to have differences. Thus, for example, the comparison of the block with z-code 0011 and the block with z-code 011000 would produce the following exclusive-or result: 010111. Note that the last two bits are set to the logic "1" state due to the differences in length between the two blocks being compared. In the example of Table 4, the two blocks with the minimum difference are the block at [2,4] and the block at [3,4]. An exclusive-or comparison between the two blocks produces the following result: 000010. Therefore, the two blocks [2,4,], [3,4] are merged to a level-4 z-region with z-code 0110. In FIG. 3, the z-regions merged are z-regions 204A, 204B, 204C, and 204D. Note that this merge causes an increase in approximation error since z-regions 204A and 204C, which are not covered by any part of the spatial object, are added to the merge block including z-regions 204A–D.

Table 5 below illustrates the final result:

TABLE 5

| Block Start | Block End | ZCode  |
|-------------|-----------|--------|
| 2,2         | 3,3       | 0011   |
| 2,4         | 3,4       | 0110   |
| 4,3         | 4,3       | 100101 |

Figure 5:
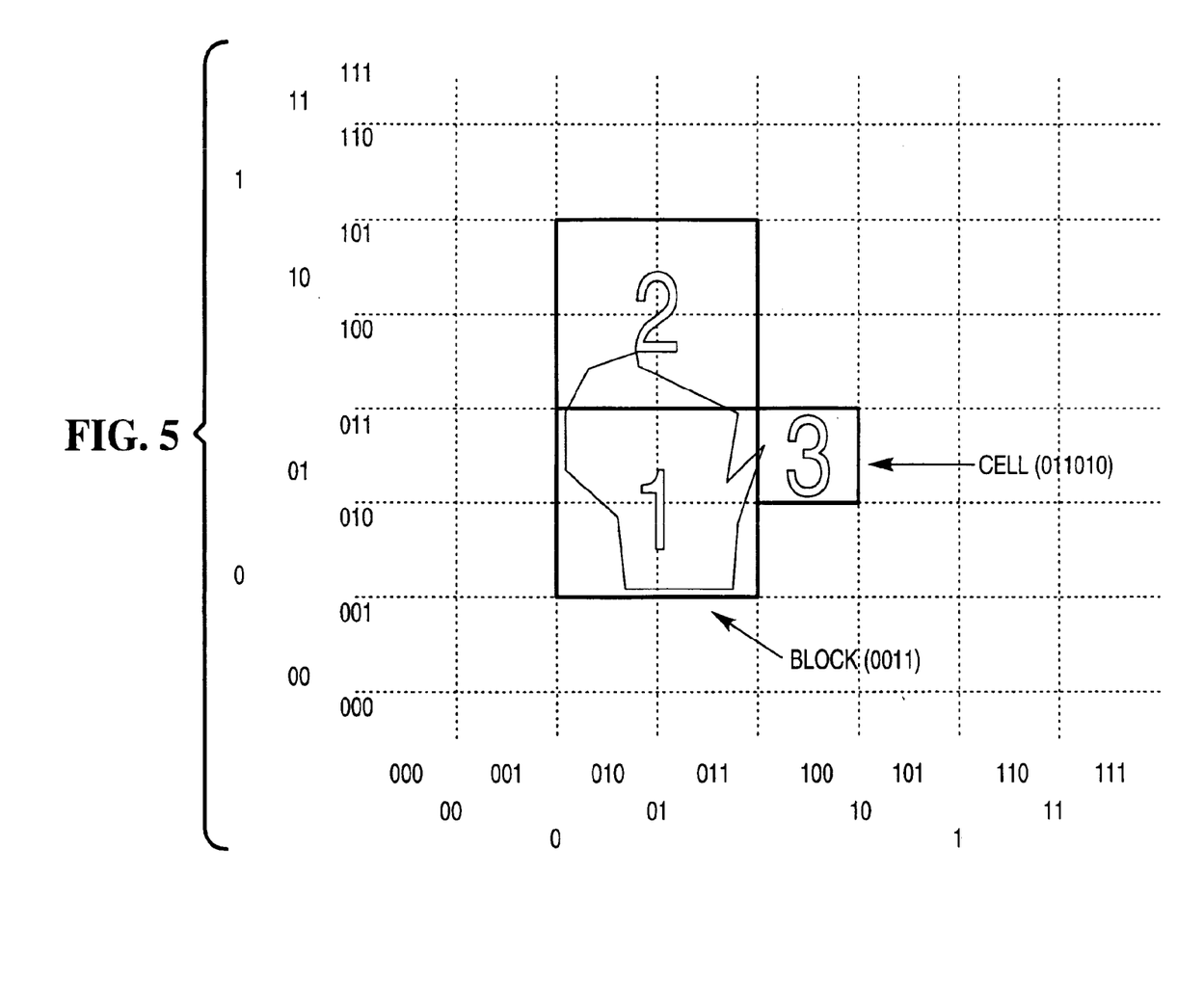
FIG. 5 illustrates blocks in z-ordered space to represent the spatial object after performing a bottom-up z-ordered decomposition.

FIG. 5 shows the three blocks (1, 2, 3) used to represent the spatial object of FIG. 3. Blocks 1 and 2 are z-regions at z-level 4, while block 3 is a z-region at z-level 6.

Figure 6:
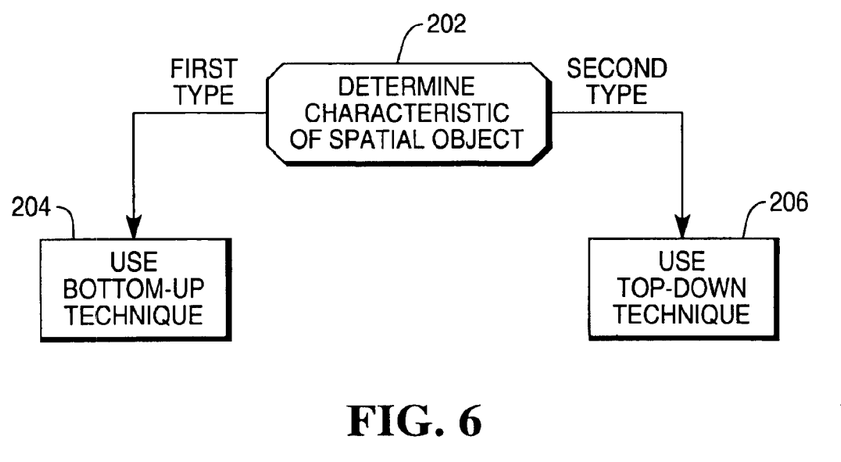
FIG. 6 is a flow diagram of a process of selectively using top-down z-ordered decomposition and bottom-up z ordered decomposition.

As noted above, the spatial routine 26 is able to selectively use one of the top-down and bottom-up techniques based on a characteristic of the spatial object. This is illustrated in FIG. 6. The spatial routine 26 determines (at 202) a characteristic of the spatial object. In one example, the characteristic is the size of the spatial object. If the spatial object has a first type characteristic (e.g., the spatial object has a small size, which can be determined by the number of z-regions covered by the spatial object), then the spatial routine uses (at 204) the bottom-up z-ordered decomposition technique to determine the representation of the spatial object. However, if the spatial object has a second type of characteristic (e.g., the spatial object is large), the spatial routine 26 uses (at 206) a top-down z-ordered decomposition technique to determine the representation of the spatial object.

Instructions of the various software routines or modules discussed herein (such as the spatial routine 26, parsing engine 24, access modules 18, and others) are loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to the system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A computer-implemented database system comprising:
   a storage to store spatial data; and
   a controller adapted to represent the spatial data in a defined space having plural levels, each level of the defined space having one region or a plurality of regions,
   the controller adapted to initially represent the spatial data with regions at a first level lower than a top level in the defined space, and subsequently to merge at least some of the regions at the first level into regions at a higher level in the defined space to represent the spatial data wherein the defined space comprises a z-ordered space, and wherein each region is associated with a z-code corresponding to the level of the region and a location of the region in z-ordered space at that level.

2. The database system of claim 1, wherein the first level comprises a predefined bottom level of the z-ordered space.

3. The database system of claim 1, wherein the controller is adapted to merge the at least some regions based on comparisons of the z-codes of the regions.

4. The database system of claim 3, wherein the controller is adapted to perform a first comparison of z-codes of regions in the same level.

5. The database system of claim 4, wherein the controller is adapted to merge z-regions in the same level that are associated with z-codes that differ only by the least significant bit.

6. The database system of claim 5, wherein the controller is adapted to repeatedly merge z-regions that are associated with z-codes that differ only by the least significant bit.

7. The database system of claim 4, wherein the controller is adapted to perform a second comparison of z-codes of regions at different levels.

8. The database system of claim 3, wherein the controller is adapted to merge the at least some regions by:
   performing a first merge of regions into a first block without increasing an area of coverage of the-merged regions; and
   performing a second merge of regions into a second block that increases the area of coverage of the merged regions, the controller adapted to identify regions to merge in the second merge while minimizing the increased area of coverage.

9. The database system of claim 1, wherein the spatial data comprises a spatial object, and wherein the controller is adapted to initially represent the spatial data with regions at the first level by identifying the regions at the first level covered by the spatial object.

10. A computer-implemented method of representing a spatial object in z-ordered space having a plurality of z-levels, the z-levels including a top z-level, the method comprising:
   assigning the spatial object to a set of z-ordered regions at a first z-level lower than the top z-level; and
   merging at least some of the z-ordered regions at the first z-level into one or more z-ordered regions at a z-level higher than the first z-level to represent the spatial object.

11. The method of claim 10, wherein assigning the spatial object to the set of z-ordered regions at the first z-level comprises assigning the spatial object to a bottom z-level in the z-ordered space.

12. The method of claim 11, further comprising repeatedly merging z-ordered regions at one z-level into z-ordered regions at a next higher z-level until one or more predetermined criteria are satisfied.

13. The method of claim 12, further comprising determining if the one or more predetermined criteria is satisfied, the one or more predetermined criteria including a maxim number of z-regions that can be used to represent the spatial object.

14. The method of claim 10, wherein assigning the spatial object to the set of z-ordered regions at the first z-level comprises decomposing the spatial object into the z-ordered regions at the first z-level covered by the spatial object.

15. The method of claim 14, wherein the z-ordered space has a first dimension and a second dimension, and wherein decomposing the spatial object comprises finding, for each interval along the first dimension covered by the spatial object, a range of intervals along the second dimension covered by the spatial object.

16. The method of claim 14, further comprising assigning a z-code to each of the z-ordered regions at the first z-level, the z-code containing a binary value representing a location of the corresponding z-ordered region in z-ordered space.

17. The method of claim 16, wherein merging the z-ordered regions at the first z-level comprises merging neighboring z-ordered regions at the first z-level into a z-ordered region at a next higher z-level.

18. The method of claim 17, wherein merging the neighboring z-ordered regions comprises comparing the z-codes of the neighboring z-ordered regions and performing the merge if the z-codes differ only by the least significant bit.

19. The method of claim 18, wherein the z-codes vary in length for z-ordered regions at different z-levels, wherein comparing the z-codes comprises comparing z-codes having the same length.

20. The method of claim 16, wherein merging the z-ordered regions comprises comparing z-codes of the regions and performing the merge of z-regions associated with z-codes that differ by a minimum amount.

21. The method of claim 20, wherein comparing the z-codes of the z-regions comprises comparing the z-codes of z-regions at different z-levels.

22. The method of claim 21, further comprising repeatedly performing the merging to reduce the number of z-regions to represent the spatial object until a predefined threshold is achieved, the predefined threshold setting a maximum number of z-regions to use for representing the spatial object.

23. An article comprising at least one computer-readable storage medium containing instructions that when executed cause a system to:
   identify a characteristic of a spatial object;
   perform a descending decomposition of a z-ordered space to assign z-ordered regions to represent the spatial object if the spatial object has a first characteristic; and
   perform an ascending decomposition of the z-ordered space to assign z-ordered regions to represent the spatial object if the spatial object has a second characteristic.

24. The article of claim 23, wherein the instructions when executed cause the system to selectively perform one of the descending decomposition based on a size of the spatial object, the characteristic comprising the size.

25. The article of claim 24, wherein the instructions when executed cause the system to perform the descending decomposition of the z-ordered space by performing a top-down decomposition of the z-ordered space.

26. The article of claim 25, wherein the instructions when executed cause the system to perform the ascending decomposition of the z-ordered space by performing a bottom-up decomposition of the z-ordered space.

27. The article of claim 23, wherein the instructions when executed cause the system to perform ascending decomposition of the z-ordered space by:
   assigning the spatial object to a set of z-ordered regions at a first z-level lower than a top z-level in the z-ordered space; and
   merging at least some of the z-ordered regions at the first level into one or more z-ordered regions at a z-level higher than the first z-level to represent the spatial object.

28. An article comprising at least one computer-readable storage medium containing instructions that when executed cause a database system to:
   represent spatial data in a defined space having plural levels, each level of the defined space having one region or a plurality of regions;
   initially represent the spatial data with regions at a first level lower than a top level in the defined space; and
   subsequently merge at least some of the regions at the first level into regions at a higher level to represent the spatial data.

* * * * *